(12) United States Patent
Kristensen et al.

(10) Patent No.: US 9,355,282 B2
(45) Date of Patent: May 31, 2016

(54) USING MULTIPLE DISPLAY SERVERS TO PROTECT DATA

(75) Inventors: Kristian H. Kristensen, Raleigh, NC (US); David Zeuthen, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 831 days.

(21) Appl. No.: 12/731,099

(22) Filed: Mar. 24, 2010

(65) Prior Publication Data

US 2011/0239125 A1 Sep. 29, 2011

(51) Int. Cl.
| | | |
|---|---|---|
| *G06F 3/048* | (2013.01) | |
| *G06F 21/84* | (2013.01) | |
| *G06F 21/31* | (2013.01) | |
| *G06F 21/62* | (2013.01) | |
| *G06F 9/54* | (2006.01) | |

(52) U.S. Cl.
CPC ............... *G06F 21/84* (2013.01); *G06F 9/543* (2013.01); *G06F 21/31* (2013.01); *G06F 21/6209* (2013.01); *G06F 21/629* (2013.01); *G06F 21/6218* (2013.01)

(58) Field of Classification Search
CPC .......... G06Q 10/10; A61B 6/00; A61B 6/467; A61B 2017/00199; G06F 3/0481
USPC ................. 715/743, 741, 733, 804, 770, 806; 726/3, 19
See application file for complete search history.

(56) References Cited

U.S. PATENT DOCUMENTS

| | | | | |
|---|---|---|---|---|
| 5,210,795 A | * | 5/1993 | Lipner et al. ................... | 713/187 |
| 5,408,600 A | * | 4/1995 | Garfinkel et al. .............. | 715/759 |
| 6,249,294 B1 | * | 6/2001 | Lefebvre et al. .............. | 345/504 |
| 6,348,933 B1 | * | 2/2002 | Walls et al. .................... | 715/744 |
| 6,366,912 B1 | * | 4/2002 | Wallent .................... | G06F 21/51 |
| 6,381,627 B1 | * | 4/2002 | Kwan et al. .................... | 709/201 |
| 6,539,380 B1 | * | 3/2003 | Moran ........................... | 707/783 |
| 6,763,370 B1 | * | 7/2004 | Schmeidler et al. .......... | 709/203 |
| 6,889,248 B1 | * | 5/2005 | Scheer ........................... | 709/209 |
| 7,200,761 B1 | * | 4/2007 | Freeman et al. .............. | 713/184 |
| 7,415,723 B2 | * | 8/2008 | Pandya ........................... | 726/13 |
| 7,428,754 B2 | * | 9/2008 | Neumann et al. ............... | 726/15 |
| 7,458,102 B2 | * | 11/2008 | Rogers .................... | H04L 29/06 |
| | | | | 713/158 |

(Continued)

OTHER PUBLICATIONS

Open Text Exceed User's Guide, Version 14, https://kb.berkeley.edu/jivekb/servlet/KbServlet/download/1715-102-192/exceed.pdf, published on Nov. 2009, last accessed Sep. 14, 2012.*

(Continued)

*Primary Examiner* — Jung-Mu Chuang
(74) *Attorney, Agent, or Firm* — Lowenstein Sandler LLP

(57) ABSTRACT

A first display server and a second display server execute on a processing device. The first display server provides a secure environment for data presented in first application windows of the first display server and the second display server provides an unsecure environment for data presented in second application windows of the second display server. The processing device receives at least one user command to copy data from one of the first application windows of the first display server to one of the second application windows of the second display server. The processing device prompts a user to perform an authentication upon receiving the at least one user command. In response to the user successfully performing the authentication, data is copied from said one of the first application windows to said one of the second application windows.

17 Claims, 7 Drawing Sheets

(56) References Cited

U.S. PATENT DOCUMENTS

| | | | |
|---|---|---|---|
| 7,461,144 B1* | 12/2008 | Beloussov et al. | 709/223 |
| 7,469,346 B2* | 12/2008 | Watson | 713/193 |
| 7,490,242 B2* | 2/2009 | Torres et al. | 713/182 |
| 7,587,413 B2* | 9/2009 | Nagral et al. | |
| 7,640,427 B2* | 12/2009 | Callas et al. | 713/153 |
| 7,650,631 B2* | 1/2010 | Lee et al. | 726/4 |
| 7,729,495 B2* | 6/2010 | Lee et al. | 380/203 |
| 7,783,665 B1* | 8/2010 | Tormasov et al. | 707/783 |
| 7,809,976 B2* | 10/2010 | Goodson et al. | 714/3 |
| 7,882,274 B2* | 2/2011 | Peterson | 710/10 |
| 7,917,771 B2* | 3/2011 | Forlenza et al. | 713/193 |
| 7,987,432 B1* | 7/2011 | Grechishkin et al. | 715/778 |
| 8,145,914 B2* | 3/2012 | Steeves | 713/184 |
| 8,171,517 B2* | 5/2012 | Hicks et al. | 725/62 |
| 8,341,747 B2* | 12/2012 | Cornwall et al. | 726/25 |
| 8,468,543 B2* | 6/2013 | Ryu et al. | 719/312 |
| 8,621,459 B2* | 12/2013 | Levit-Gurevich et al. | 718/1 |
| 8,621,549 B2* | 12/2013 | Lim | 726/1 |
| 8,656,386 B1* | 2/2014 | Baimetov et al. | 718/1 |
| 8,719,901 B2* | 5/2014 | Nguyen | G06F 21/6236 713/155 |
| 8,832,784 B2* | 9/2014 | Budko | G06F 21/53 709/227 |
| 8,909,925 B2* | 12/2014 | Baskaran | G06F 21/10 713/165 |
| 2002/0002688 A1* | 1/2002 | Gregg et al. | 713/202 |
| 2002/0031225 A1* | 3/2002 | Hines | 380/247 |
| 2002/0169987 A1* | 11/2002 | Meushaw et al. | 713/201 |
| 2004/0165588 A1* | 8/2004 | Pandya | 370/389 |
| 2005/0120160 A1* | 6/2005 | Plouffe et al. | 711/1 |
| 2005/0168471 A1* | 8/2005 | Paquette | 345/536 |
| 2005/0183021 A1* | 8/2005 | Allen et al. | 715/747 |
| 2005/0204126 A1* | 9/2005 | Watson | 713/150 |
| 2005/0246761 A1* | 11/2005 | Ross et al. | 726/1 |
| 2006/0041761 A1* | 2/2006 | Neumann et al. | 713/189 |
| 2006/0107309 A1* | 5/2006 | Fiske | 726/2 |
| 2006/0174323 A1* | 8/2006 | Brown et al. | 726/3 |
| 2006/0190606 A1* | 8/2006 | Kohavi | G06F 21/51 709/226 |
| 2006/0225137 A1* | 10/2006 | Odins-Lucas et al. | 726/27 |
| 2007/0016771 A1* | 1/2007 | Allison | G06F 21/6209 713/165 |
| 2007/0038676 A1* | 2/2007 | Nagral et al. | 707/104.1 |
| 2007/0038939 A1* | 2/2007 | Challen et al. | 715/734 |
| 2007/0156897 A1* | 7/2007 | Lim | 709/225 |
| 2007/0204153 A1* | 8/2007 | Tome | H04L 63/0272 713/164 |
| 2007/0204166 A1 | 8/2007 | Tome et al. | 713/182 |
| 2007/0255963 A1* | 11/2007 | Pizano et al. | 713/189 |
| 2007/0266428 A1* | 11/2007 | Downes et al. | 726/5 |
| 2007/0300220 A1* | 12/2007 | Seliger et al. | 718/1 |
| 2008/0077993 A1* | 3/2008 | Zimmer et al. | 726/27 |
| 2008/0086646 A1* | 4/2008 | Pizano | 713/189 |
| 2008/0162527 A1* | 7/2008 | Pizano et al. | 707/102 |
| 2008/0162646 A1* | 7/2008 | Pizano et al. | 709/206 |
| 2008/0271117 A1* | 10/2008 | Hamilton et al. | 726/3 |
| 2008/0307506 A1* | 12/2008 | Saldhana | 726/4 |
| 2009/0083450 A1* | 3/2009 | Peterson | 710/10 |
| 2009/0100163 A1* | 4/2009 | Tsao | 709/223 |
| 2009/0260056 A1* | 10/2009 | Garg et al. | 726/1 |
| 2009/0319786 A1* | 12/2009 | Viscomi et al. | 713/165 |
| 2010/0079414 A1* | 4/2010 | Ferlitsch | 345/179 |
| 2010/0269135 A1* | 10/2010 | Hulse et al. | 725/37 |
| 2010/0313209 A1* | 12/2010 | Ryu et al. | 719/319 |
| 2011/0010755 A1* | 1/2011 | Virtanen | 726/2 |
| 2011/0113467 A1* | 5/2011 | Agarwal et al. | 726/1 |
| 2011/0138283 A1* | 6/2011 | Marston | 715/724 |
| 2011/0239125 A1* | 9/2011 | Kristensen et al. | 715/743 |
| 2013/0191890 A1* | 7/2013 | Li | G06F 21/31 726/5 |

OTHER PUBLICATIONS

Windows_Terminal_Server_2003 (see http://technet.microsoft.com/en-us/library/cc755399(v=ws.10).aspx, updated Mar. 28, 2003, last accessed Sep. 14, 2012.*

OpenTextSecureShell (see https://kb.berkeley.edu/jivekb/serylet/KbServlet/download/1725-102-201/secureshell.pdf, published Nov. 2009, last accessed Sep. 14, 2012.*

X-Windows System (see http://web.archive.org/web/20100124230003/http://en.wikipedia.org/wiki/X_Window_System dated Jan. 24, 2010, last accessed Sep. 14, 2012.*

Compositing Window Manager (see http://web.archive.org/web/20090217213301/http://en.wikipedia.org/wiki/Compositing_window_manager, dated Feb. 17, 2009, last accessed Sep. 14, 2012.*

"Fedora 11 Installation Guide: Installing Fedora 11 on x86, AMD64, and Intel® 64 architectures," Ed. 1.0, Fedora Documentation Project, fedora-docs-list@redhat.com, Red Hat, Inc. and others, 2009, 274 pages.

"Fedora 11 User Guide: Using Fedora 11 for common desktop computing tasks," Ed. 1.0, Fedora Documentation Project, fedora-docs-list@redhat.com, Red Hat, Inc. and others, 2009, 118 pages.

Matic, Davor, "Xnest—a nested X server," MIT X Consortium, 5 pages, retrieved from the XFree86 Project, Inc. website: http://www.xfree86.org/4.0/Xnest.1.html Dec. 2009.

"Multiseat Configuration/Xephyr," May 11, 2009, 9 pages, retrieved from Wikibooks website: http://en.wikibooks.org/wiki/Multiseat_Configuration/Xephyr Mar. 2010.

Russinovich, Mark, "Security: Inside Windows Vista User Account Control," TechNet Magazine, Jun. 2007, pp. 1-14, Microsoft Corporation and CMP Media. Retrieved from http://207.46.16.252/en-us/magazine/2007.06.uac.aspx Mar. 2010.

"Understanding and Configuring User Account Control in Windows Vista," Microsoft TechNet, Microsoft Corporation, 55 pages, retrieved from http://technet.microsoft.com/en-us/library/cc709628(WS.10,printer).aspx Dec. 2009.

* cited by examiner

USING MULTIPLE DISPLAY SERVERS TO PROTECT DATA

TECHNICAL FIELD

Embodiments of the present invention relate generally to protecting data, and more specifically to using multiple display servers to prevent unauthorized copying of data.

BACKGROUND

Typically, a computing device includes a single display server and window manager for managing application windows presented on a display of the computing device. The single display server provides an unsecure environment to applications running within the display server. In the unsecure environment provided by the single display server, a user can freely copy and paste between application windows, can perform screen shots, and can perform drag and drop operations. Thus, typical computing systems are not ideal for the storage and use of confidential or secret information.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
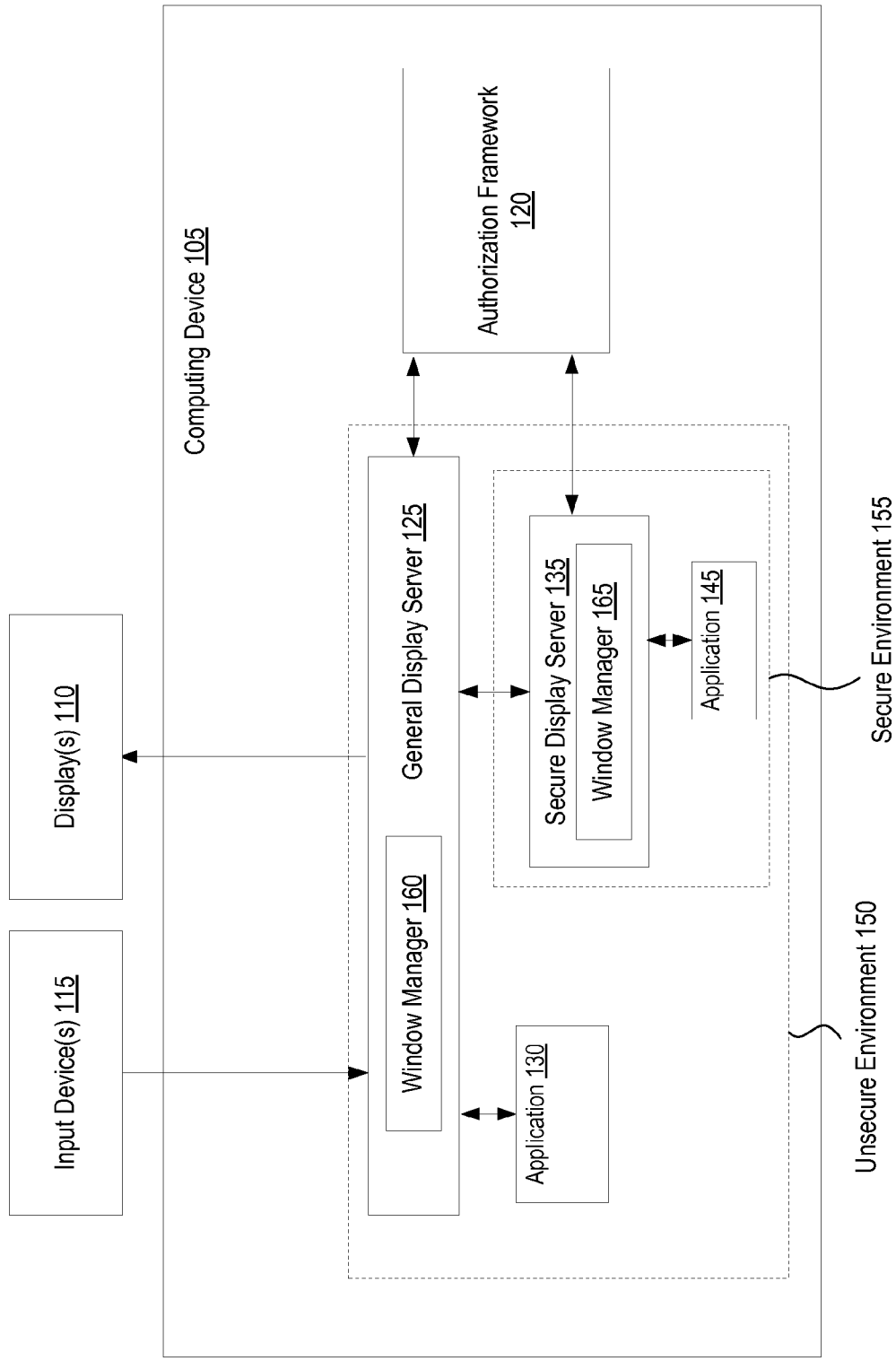
FIG. 1 illustrates one embodiment of a computing device that includes multiple display servers.

Described herein is a method and system for protecting data from unauthorized copying. In one embodiment, a processing device executes a first display server and a second display server. The first display server provides a secure environment for data presented in first application windows of the first display server and the second display server provides an unsecure environment for data presented in second application windows of the second display server. The processing device receives at least one user command to copy data from one of the first application windows of the first display server to one of the second application windows of the second display server. The processing device prompts a user to perform an authentication upon receiving the at least one user command. In response to the user successfully performing the authentication, data is copied from the first application window to the second application window.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "executing", "copying", "receiving", "prompting", "rendering", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

FIG. 1 illustrates one embodiment of a computing device 105 that includes multiple display servers. The computing device 105 may be a desktop computer, notebook computer, tablet computer, mobile phone, personal digital assistant (PDA), rackmount server, game console, or other computing device. The computing device 105 is connected with one or more input devices 115, such as a mouse, touch panel, keyboard, digital pen, microphone, or other input device. The computing device 105 is further connected with one or more displays 110, which may be monitors (e.g., liquid crystal display (LCD) monitors, cathode ray tube (CRT) monitors, etc.), projectors (e.g., digital light projection (DLP) projectors, LCD projectors, etc.), stereoscopic goggles, or the like.

The computing device 105 includes a general display server 125 and a secure display server 135 that acts as a client of the general display server 125. A display server is a windowing system that supports the implementation of window managers and provides a framework for a graphical user interface. Display servers may be responsible for presenting and maintaining rendered graphics, drawing lines, arcs, dots or other graphical primitives, rendering fonts, and so on. Display servers enable a user to work with several applications (programs) concurrently, where each application has its own application window. Examples of commonly used display servers (windowing systems) include the X Window System® (used in Linux® and Unix® machines), Desktop Window Manager (of Windows Vista® and Windows 7®) and Quartz Compositor (of OS X®, also known as "WindowServer").

One or both of the general display server 125 and secure display server 135 may include a window manager 160, 165. In one embodiment, functions of the window manager 160 are built into the general display server 125. For example, on Windows® operating systems, the display server (windowing system) and window manager are one and the same (e.g., the Desktop Window Manager in Windows Vista® is both a display server and a window manager). Alternatively, the window manager 160 may be a separate application that runs on top of the general display server 125. For example, the display server of the X Window System® does not include a window manager 160. Instead, a user may choose from one of many available window managers to use with the display server of the X Window System®. Similarly, the functions of window manager 165 may be built into secure display server 135, or window manager 165 may be a separate application that runs on top of secure display server 135. However, in one embodiment, secure display server 135 does not include window manager 165 (e.g., window manager 165 is not a component of secure display server 135 and does not run on top of secure display server 135).

A window manager controls the placement and appearance of application windows. Window managers perform actions such as drawing windows and their borders, and moving and resizing windows in response to requests from applications. Window managers control how windows are displayed on the screen, how they are moved and modified, how the user interacts with application windows, how windows interact with each other (e.g., allowing windows to overlap), and so forth.

In one embodiment, window manager 160 (or window manager 165) is a stacking window manager. A stacking window manager renders windows one-by-one at specific coordinates to a screen output, which is sent to display 110. If the coordinates of one window overlap the coordinates of another window, then the later window overwrites a visible part of the previous window where the overlap occurs. In another embodiment, window manager 160 (or window manager 165) is a tiling window manager, which organizes the screen into mutually non-overlapping frames. In yet another embodiment, window manager 160 (or window manager 165) is a compositing window manager. A compositing window manager renders windows in off-screen buffers, and then combines the contents of those off-screen buffers and outputs a result to the screen output. Compositing window managers are described in greater detail with reference to FIG. 4.

The general display server 125 provides input/output (I/O) services to client applications. In the illustrated embodiment, client applications of the general display server 125 include application 130 and secure display server 135. When an input device event (e.g., a mouse click, key press of a keyboard, cursor movement, etc.) is received from an input device 115, general display server 125 identifies applications to which the input device event should be sent (e.g., an active application, an application associated with current desktop coordinates of a cursor, etc.). Each application has an application window that is assigned particular desktop coordinates. If the current desktop coordinates for the cursor match those of an application window, the input device event is passed on to the application controlling that application window. Additionally, if an application window is active or has otherwise requested to be informed of input device events, then the input device event (e.g., key strokes of a keyboard) may be passed on to the application.

The general display server 125 also provides display services to client applications (e.g., to application 130 and to secure display server 135). General display server 125 may receive graphics data from application windows and output the graphics data to a screen output. The graphics data 125 may be rendered by the client or by the general display server 125 and/or window manager 160 prior to being sent to the screen output and on to display 110.

The secure display server 135 is a display server that operates as a client to the general display server 125. The general display server 125 may treat the secure display server 135 as any other client. The secure display server 135 and the general display server 125 may be different instances of the same display server (e.g., both may be X Window Display Servers), or may be different display servers (e.g., general display server 125 may be Windows' Desktop Window Manager and secure display server 135 may be an X Window Display Server).

As a display server, secure display server 135 may have its own clients, such as application 145. Accordingly, clients (e.g., application 145) of secure display server 135 may send graphics information to secure display server 135, which may in turn forward the graphics information to general display server 125. Similarly, general window server 125 may send input device events from the input devices 115 to secure display server 135, which may then forward the input device events to clients (e.g., to application 145).

Typically, all resources available to a display server (including resources of applications that are clients of the display server) are made available to all clients of the display server. Such resources include the graphics data associated with application windows (e.g., data presented in application windows of the display server's clients), input events received by the display server (e.g., received keystrokes from a keyboard), and so forth.

Any application can be a client of general display server 125. This may include word processor software, games, drawing programs, spreadsheet software, presentation software, etc. Applications that execute on the general display server 125 are typically executed without requiring a user to enter any credentials or otherwise authenticate themselves. Moreover, operations such as copying data, taking screen shots, etc. can be performed by clients of the general display server 125 without requiring the clients to provide credentials or otherwise authenticate themselves. Therefore, general display server 125 provides an unsecure environment 150 to its clients. The unsecure environment 150 provided by general display server 125 introduces minimal or no user inconvenience, and may be appropriate for working with unsecure information such as public information, or information that is neither confidential nor secret. However, the unsecure environment 150 is unsuitable for applications that operate on confidential or secret information, because in the unsecure environment 150 such information can be easily obtained by clients of the general display server 125.

Secure display server 135 includes its own environment that is separate from the general display server's 125 environment. Secure display server 135 may require that any application executing within the secure display server 135 satisfy one or more security conditions. For example, when application 145 is started up, a user of application 145 may be required to enter a username and/or password. Additionally, application 145 may be checked against a list of approved applications before it is permitted to become a client of secure display server 135. Thus, secure display server 135 provides a secure environment 155 for client applications (e.g., for application 145).

Certain documents or other files may be tagged as secure, and may have security conditions associated with them. In one embodiment, such documents and files can only be opened by applications that are running in the secure environment 155. Alternatively, all documents and files stored at a particular location (e.g., on a secure storage device) may be associated with security rules that prohibit those documents/files from being opened by applications running in the unsecure environment 150. Thus, when a user attempts to open a secure document, a word processor application, for example, would initiate in the secure environment 155 of secure display server 135. When the word processor application is initiated, a user may be prompted to enter a password, username and/or additional credentials associated with the document and/or with the application.

In one embodiment, when a user attempts to open a secure document/file, or attempts to open an application in the secure environment, authorization framework 120 is invoked. Authorization framework 120 then handles user authentication and/or authorization. Authorization framework 120 is discussed in greater detail below with reference to FIG. 2.

In one embodiment, general display server 125 provides inter-client communication services that enable clients of the general display server 125 to send data to other clients and/or obtain data from other clients. Clients may send data to the general display server 125 along with a request that the general display server 125 send an event or other message that includes the data to a specified client. Secure display server 135 may provide similar inter-client communication services for clients of the secure display server 135.

Clients of secure display server 135 may communicate with clients of general display server 125. For example, application 130 may communicate with application 145. Application 145 may send data to secure display server 135 along with a request for an event to be sent to application 130. Secure display server 135 may then forward the request and data to general display server 125, which may send the requested event to application 130. Similarly, application 130 may send data to general display server 125 along with a request for an event to be sent to application 145. General display server 125 may send the requested event to secure display server 135, which may forward the event to application 145.

One common reason for inter-client communication is to copy data from one application window to another application window. Such copying of data between application windows includes cut-and-paste operations and drag-and-drop operations. There are two principal techniques to perform a cut-and-paste operation. In a first cut-and-paste technique, commonly known as "selection," when a user issues a copy command for a selected data item (e.g., a block of text, image, chart, or other data), an address to the application window controlling that data item and to the specific selected item within that application window is recorded by the display server. Upon a user issuing a paste command in another application window, that application sends a request to the display server for the data item, which in turn forwards the request to the application window that controls the data item. The application window controlling the data item then sends a copy of the data item to the requesting application window. In a second cut-and-paste technique, commonly known as a "cut buffer," when the user issues a copy command for a selected data item controlled by an application, that data item is copied to a buffer that is not controlled by the application. Thereafter, when a user issues a paste command in another application window, that application sends a request to the display server for the data item, which obtains the data item from the buffer and sends it to the requesting application window. A clipboard (e.g., as offered in Microsoft Windows OSes) is one example of a cut buffer.

The drag-and-drop operation is performed when a user selects a block of text or another item in a first application window, clicks on the selection, and drags it into another application window. As with selection, drag-and-drop requires active communication between the requesting application window and the application window that controls the data. Once the selection has been dragged to a destination application window, that destination application window requests the data associated with that selection from the controlling application window. In response, the controlling application window sends the data to the destination application window.

On occasion, a user may attempt to copy data from an application window running in the secure environment 155 to an application window running in the unsecure environment 150. When a user attempts to copy information from an application window in the secure environment 155 to an application window in the unsecure environment 150, authorization framework 120 is invoked. Authorization framework may be invoked, for example, by secure display server 135, general display server 125, or a client of secure display server (e.g., application 145).

In one embodiment, authorization framework 120 is responsible for administering security conditions, for obtaining user credentials, for authorizing and authenticating applications, and for otherwise maintaining the security of secure environment 155. Authorization framework 120 determines whether a particular client (e.g., application 130) communicating with a privileged/trusted application (e.g., application 145) can access data of the privileged/trusted application. The authorization framework 120 may combine the functionalities of authorization and authentication in a unified application programming interface (API), which may be implemented, for example, as an inter-process call (IPC) or system bus message mechanism (e.g., D-bus or UNIX pipes). If a user successfully authenticates himself, the authorization framework 120 may authorize the request for data (e.g., authorize a copy operation to be performed). Otherwise, the requested data may not be copied to the requesting application window.

In one embodiment, when the "selection" technique for performing a copy-and-paste action is used, the authorization framework 120 is invoked upon a client of general display server 125 (e.g., application 130) issuing the paste command. Similarly, for the drag-and-drop action, the authorization framework 120 is invoked upon a user completing the dragand-drop action (e.g., when the user has moved a selected data item onto the application window where the data item is to be copied, and has released a mouse button). In these examples, the authorization framework 120 may be invoked by the secure display server 135 or by a client of the secure display server 135 (e.g., application 145) before sending data outside of the secure environment 155 (e.g., to application 130). If a user of the requesting application window is unable to successfully meet authentication and/or authorization conditions, then the paste or drag-and-drop operation is not completed.

In another embodiment, when the "cut buffer" technique for performing a copy-and-paste action is used, the authorization framework 120 is invoked upon a user issuing the copy command. Alternatively, the authorization framework 120 may be invoked whenever a client of general display server 125 tries to access the contents of the cut buffer. In one embodiment, a separate cut buffer is maintained for the secure display server 135 and for the general display server 125. Data copied to the general display server's 125 cut buffer may be freely accessed, while data copied to the secure display server's 135 cut buffer may only be accessed upon authorization and/or authentication by authorization framework 120.

By using authorization framework 120 and multiple display servers 125, 135, confidential and secret data may be secured from copying between application windows. Thus, security is increased for such data.

Note that though only a single secure display server 135 is shown as a client of general display server 125, general display server 125 may include multiple secure display server clients. Each of the secure display server clients may provide different levels of security and be used for different categories of documents/files. For example, a first secure display server may be used for secret documents and a second secure display server may be used for top-secret documents. The authorization framework may be invoked whenever data is to be copied to an environment having a lower security than the present environment in which it is presented.

Figure 2:
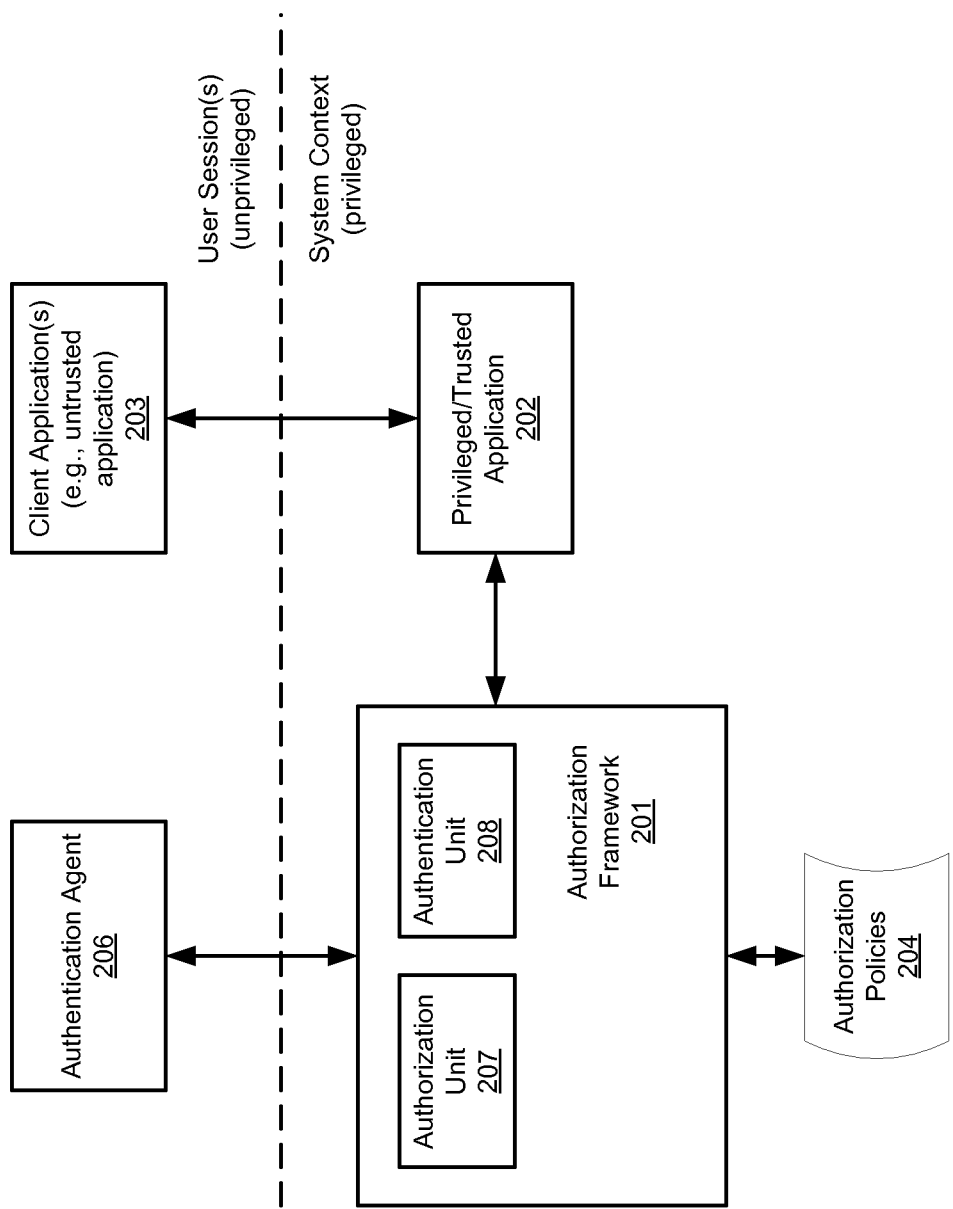
FIG. 2 illustrates an authorization framework, in accordance with one embodiment of the present invention.

In one embodiment, a separate secure display server is loaded for each application that is to be run in a secure environment. When a confidential or secret document is to be opened, a new secure display server may be loaded as a client of the general display server. An application associated with the confidential or secret document is then loaded as a client of the new secure display server. This may restrict sharing of information even between applications running in secure environments, because each runs in its own separate secure environment. FIG. 2 is a block diagram of an authorization framework 201, in accordance with one embodiment of the present invention. Authorization framework 201 can be accessed by a privileged or trusted application 202 via an authorization API, which may be implemented as a part of IPC or system bus mechanism (e.g., D-Bus or UNIX pipes). Privileged/trusted application 202 may be any system component that is trusted by the system, which is running within the trusted system context. For example, privileged/trusted application 202 may be a secure display server 135 or a client of secure display server 135 (e.g., application 145). In one embodiment, general display server 125 is also a privileged/trusted application 202. Alternatively, general display server 125 is an untrusted application 203.

In one embodiment, when a client application 203 (e.g., client of general display server 125) communicates with a privileged application 202 (e.g., secure display server 135 or application 145) for accessing a service provided by the privileged application 202, privileged application 202 communicates with authorization framework 201 to determine whether client 203 is authorized for accessing the requested service. In response, authorization unit 207 is configured to authorize client 203 in view of one or more authorization policies 204, which may be stored in memory, local storage, or remote storage.

When privileged/trusted application 202 communicates with authorization framework 201, certain information for identifying client 203 may also be communicated to the authorization framework 201, such as, for example, a user identifier (ID) identifying a user of the client application 203, a process ID identifying the client application 203, a session ID identifying a user or desktop session within which the client application 203 is running, and/or an action ID identifying an action to be carried out by the privileged/trusted application 202. Certain OS specific attributes such as security context may also be included. Additionally, whether the client application 203 is operating in the unsecure environment 150 or secure environment 155 may be included. Based on such information, authorization unit 207 examines one or more authorization policies 204 to determine whether client 203 is authorized to access a particular service (e.g., action) carried out by the privileged/trusted application 202 (e.g., whether to permit a copy operation, a paste operation, or a drag-and-drop operation).

The result of the authorization process may be a "yes," which indicates that the requested action should be carried out by the trusted application 202. Alternatively, the result of the authorization process may be a "no," which indicates that the requested action should not be carried out by the trusted application 202. Further, the result of the authorization process may be an "authentication required" which indicates that the requested action should only be carried out by the trusted application 202 if the user of the client application has been successfully authenticated. According to one embodiment, the privileged/trusted application 202 may specify or include an attribute indicating whether a user interaction is allowed.

If it is determined that client 203 is authorized to access the requested service, but would require authentication, authorization framework further determines whether a user associated with client 203 should be authorized to access the requested services by authenticating the user. If it is determined that the user of client 203 needs to be authenticated, authentication unit 208 invokes an authentication agent 206 which may run within the same user session of client 203 (which may be identified by a session ID), or which may run on an entirely separate computing device. Authentication agent 206 may display a dialog box for prompting the user to enter certain credentials to authenticate the user. Based on the credentials entered by the user, authentication unit 208 is configured to authenticate the user in view of authentication information stored in the authorization policies. If the user is successfully authenticated, authorization framework 201 returns a value to privileged/trusted application 202 indicating whether the requested service is authorized to be carried out by the privileged/trusted application 202. Authentication agent 206 may ask for passwords or other kinds of authentication (e.g., checking fingerprint, etc.)

In one embodiment, authentication agent 206 runs on a separate computing device than authorization framework 201. For example, authentication agent 206 may run on a mobile phone, universal serial bus (USB) device, or other mobile computing device, and the authorization framework 201 may run on a laptop computer, desktop computer, or other larger computing device. Where the authentication agent 206 and authorization framework 201 operate on separate computing devices, the computing devices may communicate, for example, using transmission control protocol/internet protocol (TCP/IP), a USB protocol, or other communication protocol.

Thus, authorization framework 201 provides an authorization API to be used by privileged/trusted application 202 offering services to unprivileged application 203 through some forms of IPC mechanisms such as D-Bus or UNIX pipes. The privileged application 202 typically treats client 203 as an untrusted application. For every request received from client 203, privileged/trusted application 202 needs to determine if the request is authorized or privileged/trusted application 202 should refuse to service client 203. By using the authorization API, privileged/trusted application 202 can offload the authorization and/or authentication process to authorization framework 201.

Figure 3:
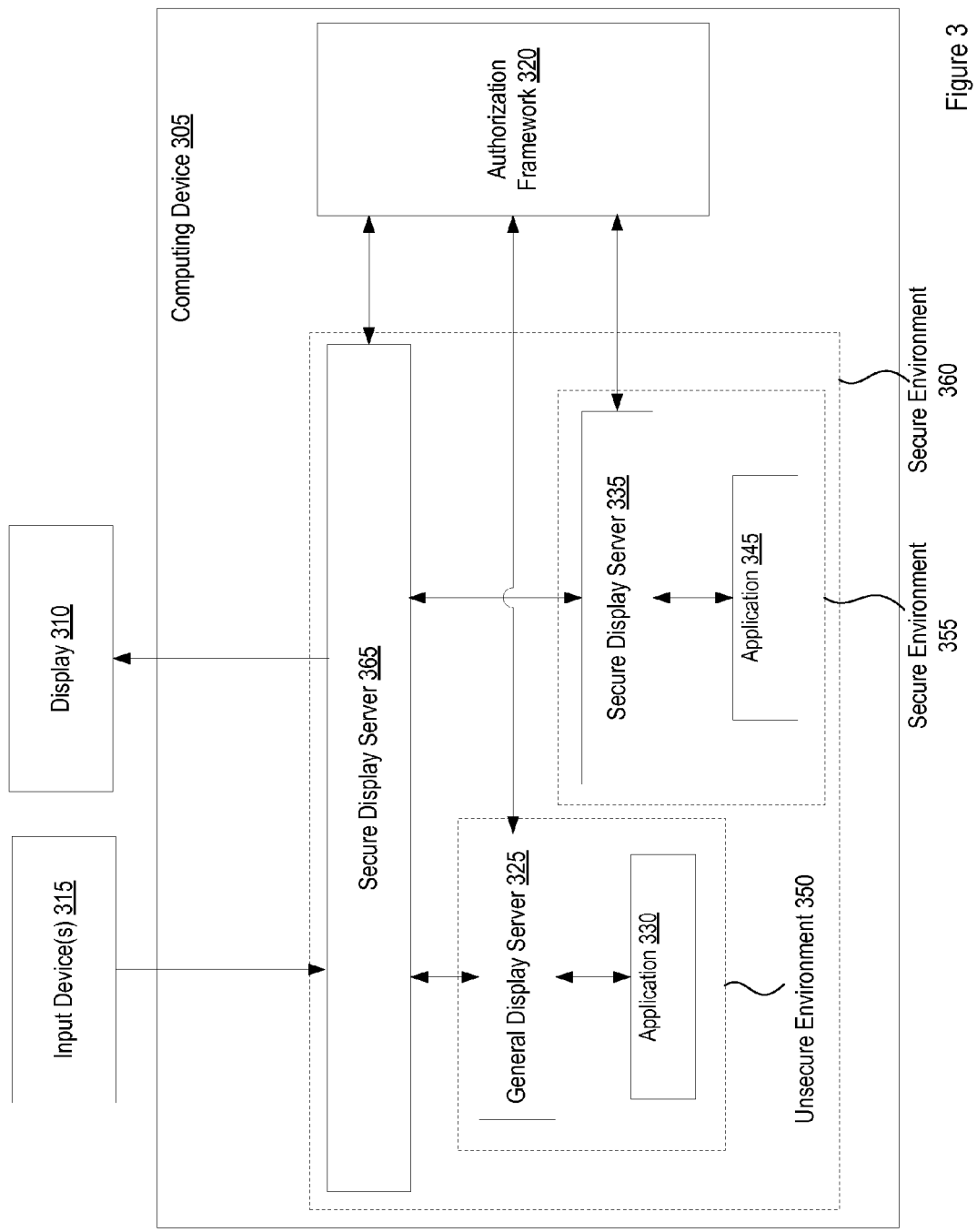
FIG. 3 illustrates another embodiment of a computing device that includes multiple display servers.

FIG. 3 illustrates another embodiment of a computing device 305 that includes multiple display servers. The computing device 305 is connected with one or more input devices 315 and a display 310, and includes an authorization framework 320, general display server 325, and a secure display server 365. In one embodiment, computing device 305 further includes an additional secure display server 335. One or more of general display server 325, secure display server 365 and secure display server 335 may include a window manager.

In computing device 105 of FIG. 1, the general display server 125 is a parent to secure display server 135. Clients of a display server typically have access to all graphics data (display output) available to that display server. This includes the graphics data associated with all clients of the display server. Therefore, one disadvantage of having the general display server 125 be the parent display server is that clients of the general display server 125 may have access to the graphics data output by clients of the secure display server 135. Similarly, clients of the general display server 125 may be able to log keystrokes and other input device events that are associated with clients of secure display server 135.

Accordingly, in computing device 305 of FIG. 3, general display server 325 is a client to secure display server 365. In one embodiment, only authorized applications are clients of secure display server 365. In a further embodiment, users must provide credentials to execute an application as a client of secure display server 365. Thus, secure display server 365 provides a secure environment 360 to clients of secure display server 365. Accordingly, only authorized clients may have access to all graphics data available to secure display server 365 and to all input device events from input device 315.

Secure display server 365 may forward input device events associated with general display server 325 and/or to clients of general display server 325 on to general display server 325. However, general display server 325 and clients of general display server 325 may not be informed of input device events that are associated with any other clients of secure display server 365. Moreover, general display server 325 and its clients may have limited or no access to graphics data of applications running in secure environment 360. Accordingly, if application 330 attempts to log keystrokes, it will only log those keystrokes associated with applications running in unsecure environment 350. Additionally, if application 330 requests access to graphics data from all applications, it may receive graphics data only of other applications running in unsecure environment 350. In one embodiment, application 330 may request graphics data of applications running in secure environment 360. In response, secure display server 365 may invoke authorization framework 320, and may only comply with the request if authorization framework 320 authorizes the requesting application (e.g., application 330).

In one embodiment, secure display server 335 is a client of secure display server 365. In a further embodiment, only display servers (e.g., secure display server 335 and general display server 325) are clients of secure display server 365. In such an embodiment, all additional applications/programs are either clients of general display server 325 (such as application 330) or of secure display server 335 (such as application 345). Secure display server 335 provides a secure environment 355 to its clients (e.g., to application 345). Secure environment 355 and secure environment 360 may include the same or different security measures. For example, secure environment 355 may be more secure than secure environment 360 or vice versa. In one embodiment, documents and files associated with a first level (e.g., a low or medium level) of security are opened by clients of secure display server 335, and documents and files associated with a second level (e.g., a high level) of security are opened by clients of secure display server 365. To copy data from a higher level of security to a lower level of security (even between different secure environments) may cause authorization framework 320 to be invoked.

Figure 4:
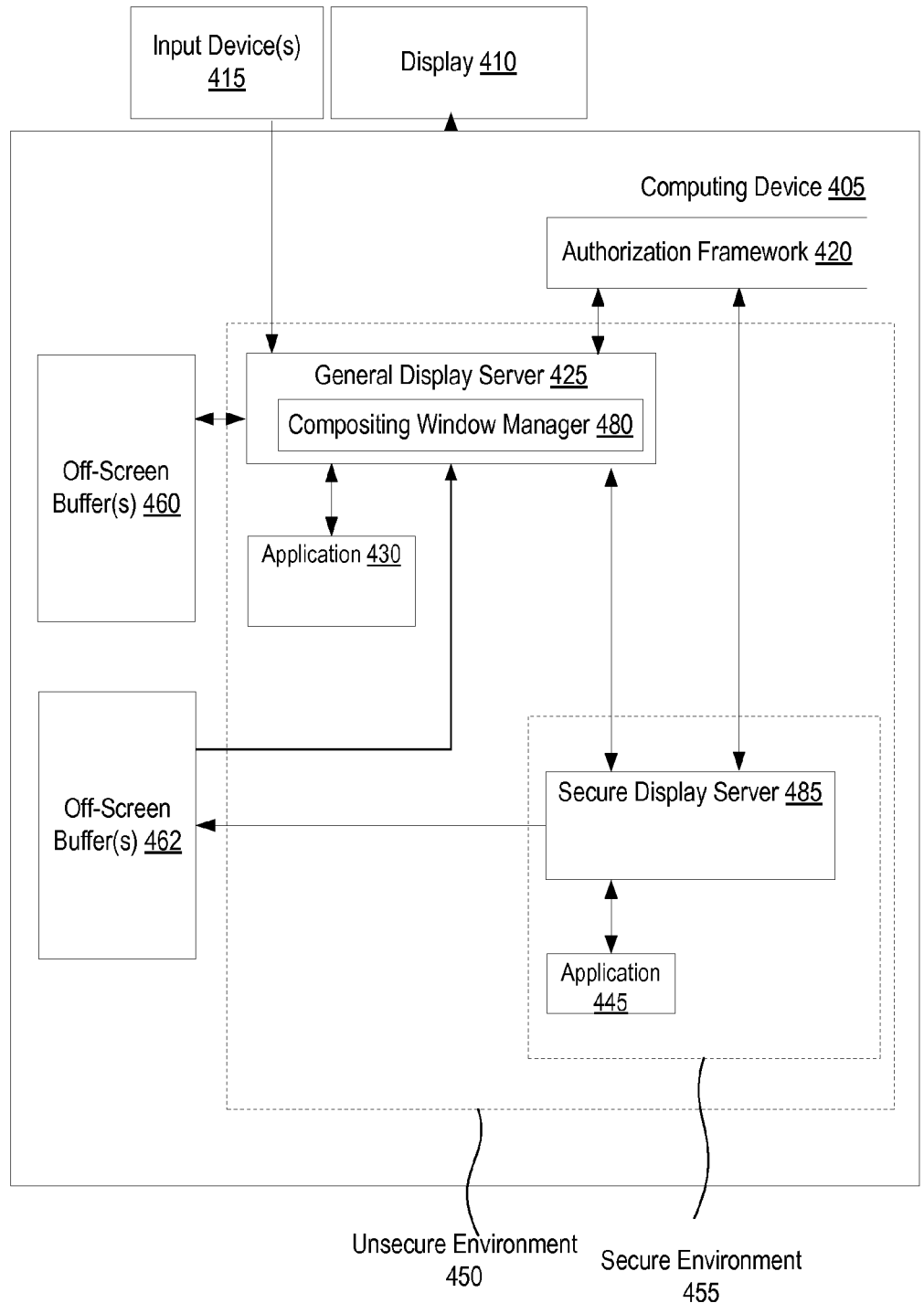
FIG. 4 illustrates yet another embodiment of a computing device that includes multiple display servers.

FIG. 4 illustrates yet another embodiment of a computing device 405 that includes multiple display servers. The computing device 405 is connected with one or more input devices 415 and a display 410, and includes an authorization framework 420, general display server 425, and a secure display server 485. Like computing device 105 of FIG. 1, in computing device 405 the general display server 125 is a parent to secure display server 485.

General display server 425 includes a compositing window manager 480. Unlike other window managers, which render graphics information (e.g., windows) straight to a screen output for display 410, a compositing window manager 480 composits (combines) contents of off-screen buffers 460, 462 (e.g., individual buffers) in system memory or video memory. The contents of the off-screen buffers 460, 462 can be manipulated and composited before being sent to the screen output. This enables each application window to behave as an independent 2D or 3D object.

In one embodiment, secure display server 485 writes graphics data for its clients to one or more off-screen buffers 462, and general display server 425 writes graphics data for its clients to one or more additional off-screen buffers 460. Alternatively, clients of secure display server (e.g., application 445) write graphics data to off-screen buffers 462, while clients of general display server 425 write graphics data to off-screen buffers 460.

Compositing window manager 480 combines the contents of off screen buffers 460 and off-screen buffers 462, and outputs a result to the screen output for presentation on display 410. The compositing window manager 480 in one embodiment does not maintain a record of the contents of the off-screen buffers 462, or of the final composited result. Therefore, this data is not readily available to clients of general display server 425. When a client of general display server 425 requests graphics data of one or more application windows (e.g., requests a screenshot), general display server accesses the contents of the off-screen buffers 460, 462 to provide the requested data. In one embodiment, general display server 425 invokes authorization framework 420 prior to accessing off-screen buffers 462. If the authorization framework 420 fails to authorize the requesting client, general display server 425 only provides the graphics data of off-screen buffers 460 to the requesting client. Thus, the information displayed in application windows operating in the secure environment 455 is not readily available to application windows operating in unsecure environment 450, increasing security of the secure environment 455.

Figure 5:
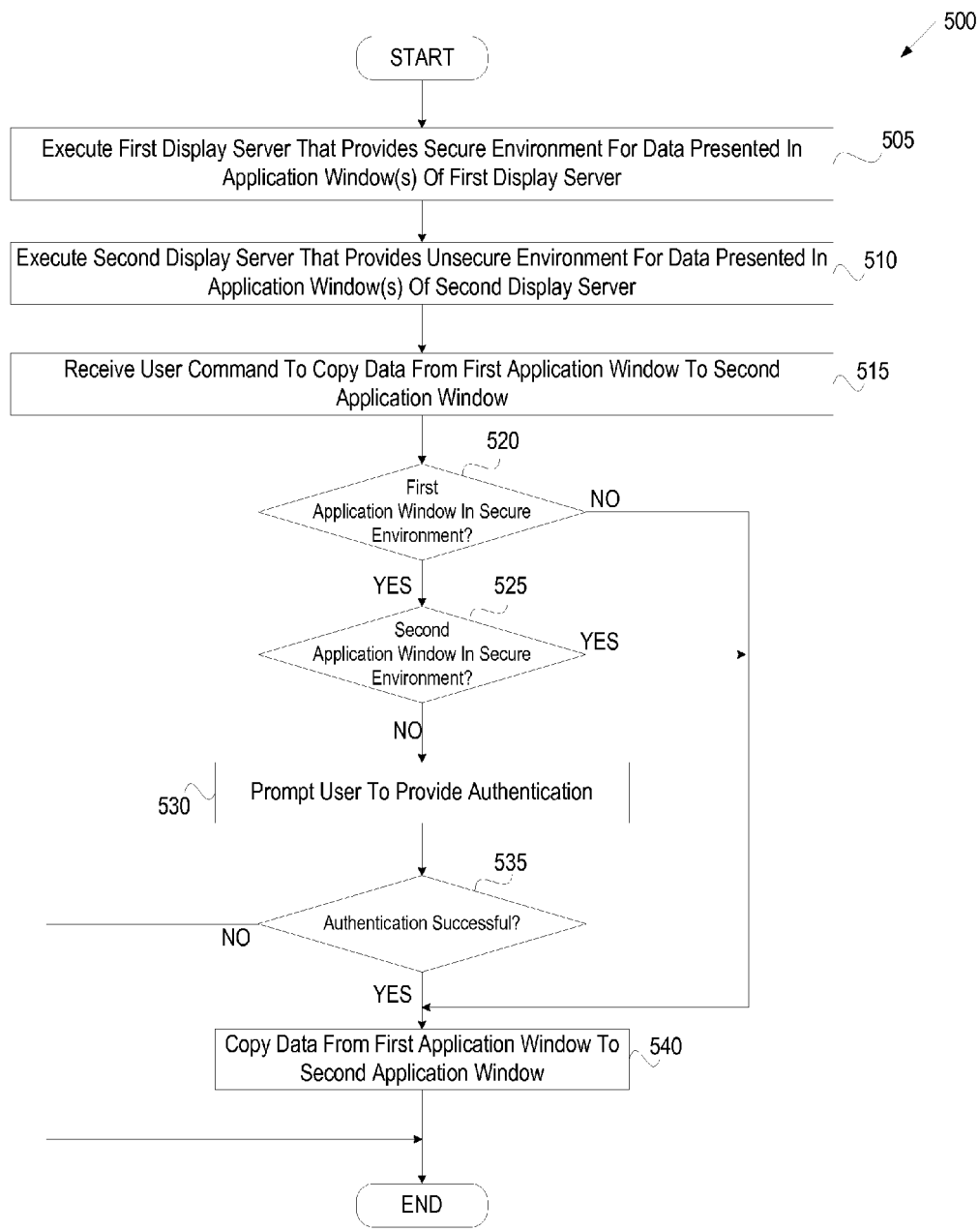
FIG. 5 is a flow diagram illustrating one embodiment of a method for protecting data from unauthorized copying.

FIG. 5 illustrates a flow diagram of one embodiment for a method 500 of securing data using multiple display servers. The method may be performed by processing logic that may comprise hardware (e.g., circuitry, dedicated logic, programmable logic, microcode, etc.), software (such as instructions run on a processing device), or a combination thereof. In one embodiment, method 500 is performed by a combination of a general display server, a secure display server and an authorization framework (e.g., general display server 125, secure display server 135 and authorization framework 120 of FIG. 1).

Referring to FIG. 5, at block 505 of method 500, a computing device executes a first display server that provides a secure environment for data presented in application windows of the first display server. At block 510, the computing device executes a second display server that provides an unsecure environment for data presented in application windows of the second display server. The first display server may be a client of the second display server. Alternatively, the second display server may be a client of the first display server. The display servers may be the same type of display server (e.g., both may be X Window System display servers) or may be different types of display servers.

At block 515, processing logic receives a user command to copy data from a first application window to a second application window. The command may be a copy command or a paste command of a copy-and-paste operation, or may be a command of a drag-and-drop operation. The user command may be received by the first display server or by the second display server.

At block 520, processing logic determines whether the first application window is operating in the secure environment (e.g., is a client of the first display server). If the first application window is not operating in the secure environment, then the method continues to block 540, and the requested data is copied from the first application window to the second application window. If the first application window is operating in the secure environment, then the method continues to block 525.

At block 525, processing logic determines whether the second application window is operating in the secure environment. If both the first application window and the second application window are operating in the secure environment, then the method continues to block 540, and the requested data is copied from the first application window to the second application window. If the second application window is not operating in the secure environment, then copying the data to the second application window would cause the data to leave the secure environment. In such an instance, the method continues to block 530.

At block 530, an authorization framework is invoked, which prompts a user to provide authentication data. The user may be required to enter a username and password, supply a digital certificate, provide biometric information (e.g., via a fingerprint reader, eye retina scanner, etc.), or provide other authenticating information. At block 535, if the user successfully authenticated himself, the method continues to block 540, and the requested data is copied from the first application window to the second application window. If the user was unable to authenticate himself, the method ends without copying the requested data.

Figure 6:
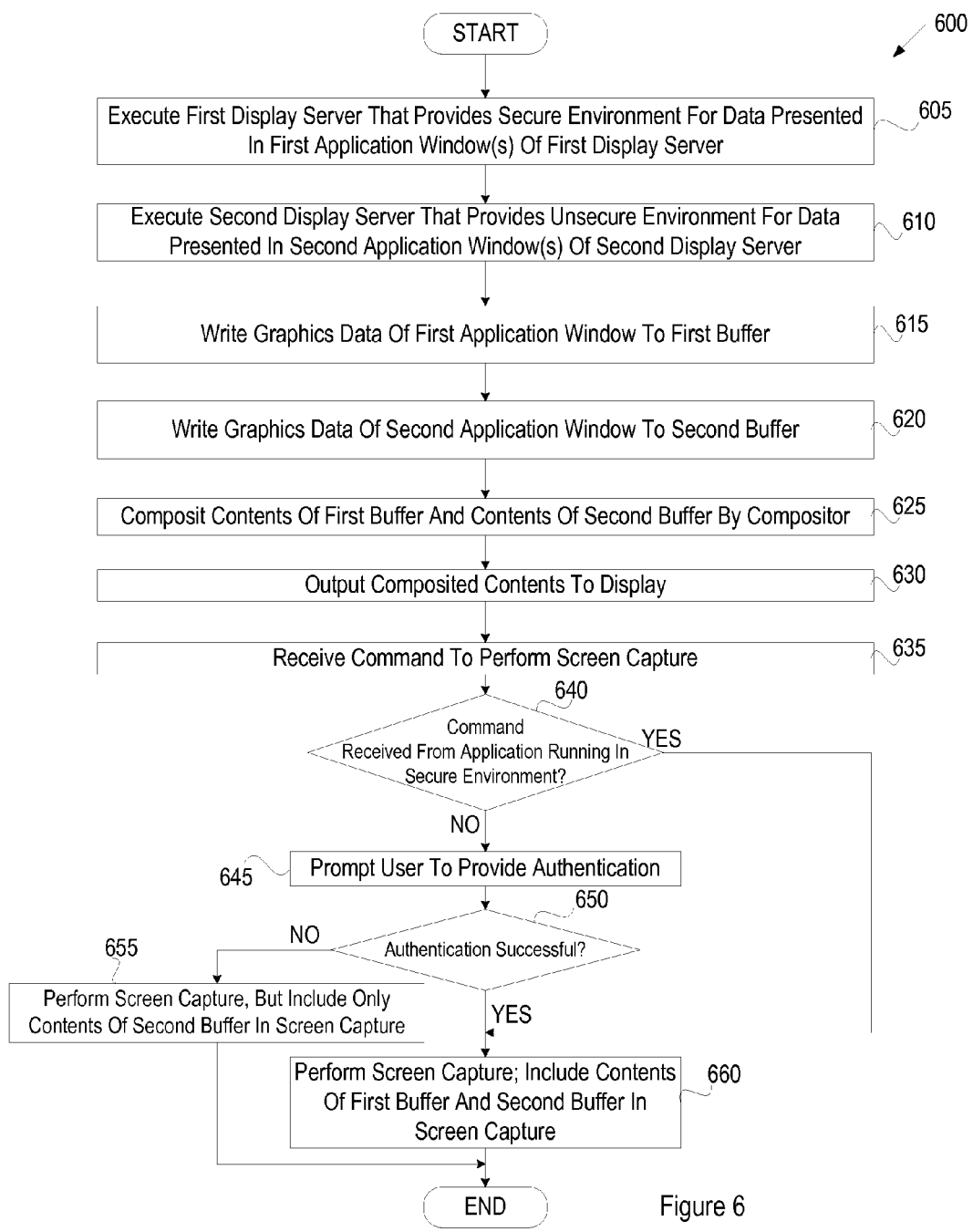
FIG. 6 is a flow diagram illustrating one embodiment of a method for protecting data from unauthorized copying.

FIG. 6 illustrates a flow diagram of another embodiment for a method 600 of securing data using multiple display servers. The method may be performed by processing logic that may comprise hardware (e.g., circuitry, dedicated logic, programmable logic, microcode, etc.), software (such as instructions run on a processing device), or a combination thereof. In one embodiment, method 600 is performed by a combination of a general display server, a secure display server and an authorization framework (e.g., general display server 125, secure display server 135 and authorization framework 120 of FIG. 1).

Referring to FIG. 6, at block 605 of method 600, a computing device executes a first display server that provides a secure environment for data presented in first application windows of the first display server. At block 610, the computing device executes a second display server that provides an unsecure environment for data presented in second application windows of the second display server. The first display server may be a client of the second display server. Alternatively, the second display server may be a client of the first display server. The display servers may be the same type of display server (e.g., both may be X Window System display servers) or may be different types of display servers.

At block 615, processing logic writes graphics data of a first application window to a first off-screen buffer. The graphics data may be written by a client application of the first display server, or may be written by the first display server. At block 620, processing logic writes graphics data of a second application window to a second off-screen buffer. This graphics data may be written by a client application of the second display server, or may be written by the second display server.

At block 625, a compositor composits the contents of the first off-screen buffer and the second off-screen buffer. At block 630, the compositor outputs the composited contents to a display.

At block 635, processing logic receives a command to perform a screen capture, or to otherwise access graphics data of the first application window. At block 640, processing logic determines whether the command originated from an application running in the secure environment. If the command originated form an application operating in the secure environment, the method continues to block 660. If the command originated from an application operating in the unsecure environment, the method continues to block 645. At block 645, processing logic prompts a user to provide authentication. In one embodiment, the processing logic invokes an authorization framework that prompts the user.

At block 650, processing logic (e.g., the authorization framework) determines whether the user has successfully authenticated himself. If authentication was successful, the method continues to block 660 and the graphics data from the first buffer and the second buffer are sent to the requesting application. The requesting application can then perform a screen shot with the received graphics data. If authentication was unsuccessful, the method continues to block 655 and graphics data from only the second buffer is sent to the requesting application. The requesting application can then perform a screenshot that does not include the graphics data of the first application window.

Figure 7:
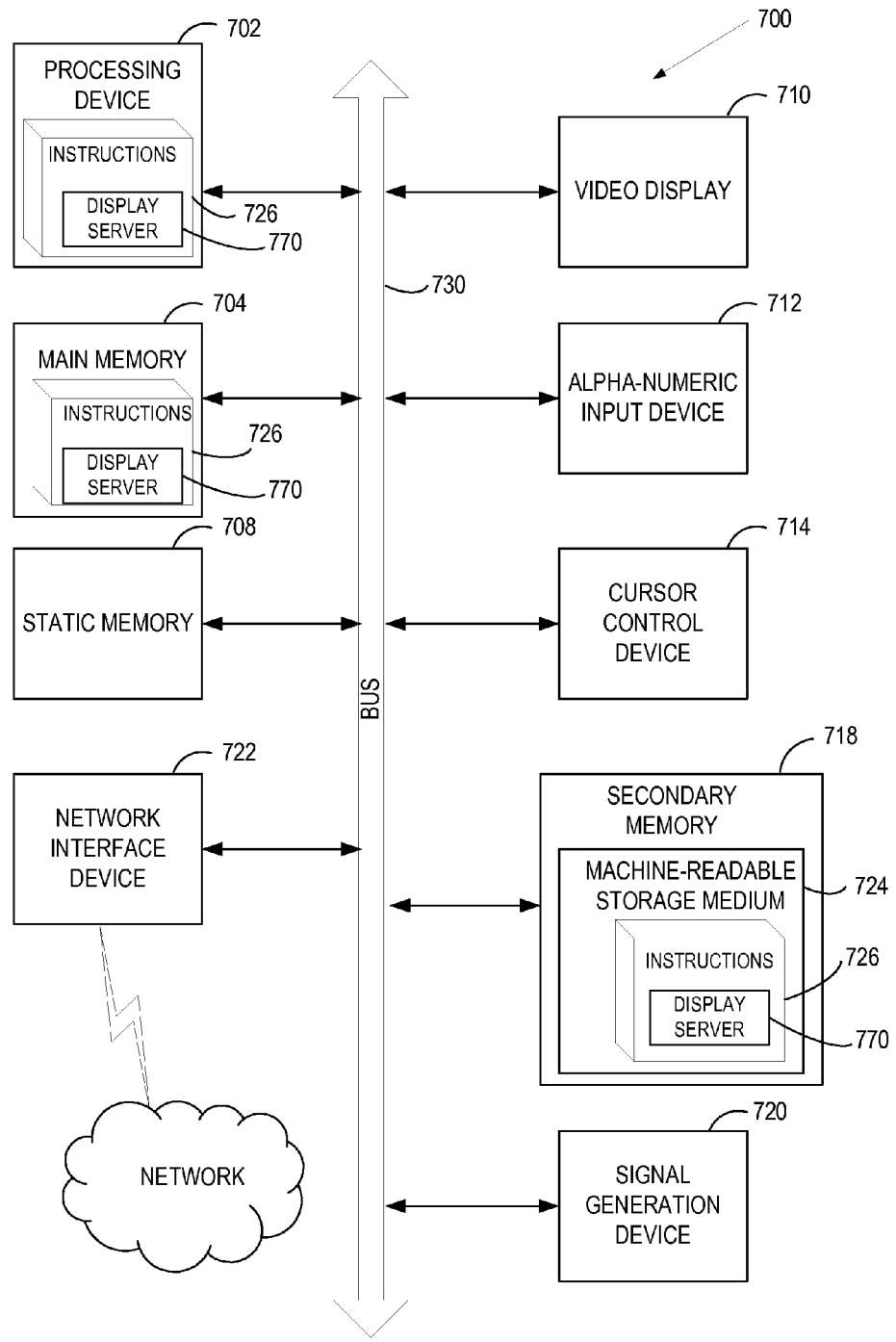
FIG. 7 illustrates a diagrammatic representation of a machine in the exemplary form of a computer system, in accordance with one embodiment of the present invention.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 708 (e.g., flash memory, static random access memory (SRAM), etc.), and a secondary memory 718 (e.g., a data storage device), which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The secondary memory 718 may include a machine-readable storage medium (or more specifically a computer-readable storage medium) 724 on which is stored one or more sets of instructions 726 (e.g., software) embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

The machine-readable storage medium 724 may also be used to store one or more display servers 770, which may correspond, for example, to general display server 125 and secure display server 135 of FIG. 1. The machine-readable storage medium 724 may also be used to store an authorization framework, which may correspond, for example, to authorization framework 120 of FIG. 1. The machine-readable storage medium may also include a software library containing methods that call the display servers and/or the authorization framework. While the machine-readable storage medium 724 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:

executing, by a processing device, a non-secure display server that provides a non-secure environment for data presented in a non-secure application window of the non-secure display server;

detecting a plurality of secure documents being opened;

executing, by the processing device in view of a first secure document of the plurality of secure documents being opened, a first secure display server as a first client to the non-secure display server, wherein the first secure display server provides a first secure environment for data of the first secure document to be presented in a first secure application window of the first secure display server and has a first security level for a first category of secure documents to restrict unauthorized sharing of information between a plurality of secure environments;

loading a first application, associated with the first secure document, as a client of the first secure display server;

executing, by the processing device in view of a second secure document of the plurality of secure documents being opened, a second secure display server as a second client to the non-secure display server, wherein the second secure display server provides a second secure environment for data of the second secure document to be presented in a second secure application window of the second secure display server, and has a second security level for a second category of secure documents to restrict unauthorized sharing of information between a plurality of secure environments;

loading a second application, associated with the second secure document, as a client of the second secure display server;

receiving a user command to copy data from the secure application window running in the first secure environment of the first secure display server to the second secure application window running in the second secure environment of the second secure display server;

determining whether the second application in the second secure display server is authorized to access a copy operation provided by the first secure display server in view of a policy and the first security level of the first secure display server;

determining whether a user associated with the user command is an authenticated user in response to the policy indicating that the second application in the second secure display server is authorized to access the copy operation provided by the first secure display server; and in response to the user being an authenticated user and the second application in the second secure display server being authorized, copying the data from the first secure application window running in the first secure environment to the second secure application window running in the second secure environment.

2. The method of claim 1, wherein receiving the user command comprises receiving a copy command to copy the data from the first secure application window in the first secure environment and a paste command to paste the data to the second secure application window in the second secure environment, and wherein determining whether the user command is associated with an authenticated user comprises performing an authentication upon receiving the paste command.

3. The method of claim 1, wherein receiving the user command comprises receiving a drag-and-drop command to drag an object representing the data from the first secure application window in the first secure environment to the second secure application window in the second secure environment.

4. The method of claim 1, further comprising:
executing a non-secure display server that provides a non-secure environment to clients of the non-secure display server, wherein the non-secure display server is a client of the first secure display server.

5. The method of claim 4, further comprising:
writing first graphics data of the secure application window in the first secure environment to a secure buffer by at least one of the first secure application window in the first secure environment or the first secure display server;
writing second graphics data of the non-secure application window to a non-secure buffer by at least one of the non-secure application window or the non-secure display server;
combining contents of the secure buffer and the non-secure buffer by a window manager; and
outputting the contents to a display.

6. The method of claim 5, further comprising:
receiving a request for the first graphics data in the secure buffer and the second graphics data in the non-secure buffer from the non-secure application window; and
performing authentication to determine whether the user is an authenticated user in response to the policy.

7. A non-transitory computer readable storage medium having instructions that, when executed by a processing device, cause the processing device to:
execute, by the processing device, a non-secure display server that provides a non-secure environment for data presented in a non-secure application window of the non-secure display server;
detect a plurality of secure documents being opened;
execute, by the processing device in view of a first secure document of the plurality of secure documents being opened, a first secure display server as a first client to the non-secure display server, wherein the first secure display server provides a first secure environment for data of the first secure document to be presented in a first secure application window of the first secure display server and has a first security level for a first category of secure documents to restrict unauthorized sharing of information between a plurality of secure environments;
load a first application associated with the first secure document as a client of the first secure display server;
execute, by the processing device in view of a second secure document of the plurality of documents being opened, a second secure display server as a second client to the non-secure display server, wherein the second secure display server provides a second secure environment for data of the second secure document to be presented in a second secure application window of the second secure display server, and has a second security level for a second category of secure documents to restrict unauthorized sharing of information between a plurality of secure environments;
load a second application, associated with the second secure document, as a client of the second secure display server;
receive a user command to copy data from the first secure application window running in the first secure environment of the first secure display server to the second secure application window running in the second secure environment of the second secure display server;
determine whether the second application in the second secure display server is authorized to access a copy operation provided by the first secure display server in view of a policy and the first security level of the first secure display server;
determine whether a user associated with the user command is an authenticated user in response to the policy indicating that the second application in the second secure display server is authorized to access the copy operation provided by the first secure display server; and
in response to the user being an authenticated user and the second application in the second secure display server being authorized, copy the data from the first secure application window running in the first secure environment to the second secure application window running in the second secure environment.

8. The non-transitory computer readable storage medium of claim 7, wherein to receive the user command comprises the processing device to:
receive a copy command to copy the data from the first secure application window in the first secure environment and a paste command to paste the data to the second secure application window in the second secure environment, and wherein the processing device is further to perform an authentication upon receiving the paste command.

9. The non-transitory computer readable storage medium of claim 7, wherein to receive the user command comprises the processing device to:
receive a drag-and-drop command to drag an object representing the data from the first secure application window in the first secure environment to the second secure application window in the second secure environment.

10. The non-transitory computer readable storage medium of claim 7, wherein the processing device is further to:
execute a non-secure display server that provides a non-secure environment to clients of the non-secure display server, wherein the non-secure display server is a client of the first secure display server.

11. The non-transitory computer readable storage medium of claim 10, wherein the processing device is further to:
write first graphics data of the first secure application window in the first secure environment to a secure buffer by at least one of the first secure application window in the first secure environment or the first secure display server;
write second graphics data of the non-secure application window to a non-secure buffer by at least one of the non-secure application window or the non-secure display server;

combine contents of the secure buffer and the non-secure buffer by a window manager; and
output the contents to a display.

12. The non-transitory computer readable storage medium of claim 11, wherein the processing device is further to:
receive a request for the first graphics data in the secure buffer and the second graphics data in the non-secure buffer from the non-secure application window; and
perform authentication to determine whether the user is an authenticated user in response to the policy.

13. A computing device, comprising:
a memory; and
a processing device, operatively coupled to the memory, the processing device to:
execute a non-secure display server to provide a non-secure environment for data presented in a non-secure application window of the non-secure display server;
detect a plurality of documents being opened;
execute, in view of a secure document of the plurality of documents being opened, a secure display server as a client to the non-secure display server, wherein the secure display server provides a secure environment for data of the secure document to be presented in a secure application window of the secure display server;
load an application associated with the secure document as a client of the secure display server;
write first graphics data of the secure application window to a secure buffer by at least one of the secure application window or the secure display server;
write second graphics data of the non-secure application window to a non-secure buffer by at least one of the non-secure application window or the non-secure display server;
receive a request for the first graphics data in the secure buffer and the second graphics data in the non-secure buffer from the non-secure application window;
determine whether the non-secure display server is authorized to access the first graphics data in the secure buffer in view of a policy;
determine whether a user associated with the request is an authenticated user in response to the policy indicating that the non-secure display server is authorized to access the first graphics data in the secure buffer; and
in response to the user being an authenticated user and the non-secure display server being authorized, combine, by a window manager, contents of the first graphics data in the secure buffer and the second graphics data in the non-secure buffer, and provide the combined contents to the requesting non-secure application window running in the non-secure environment, and
in response to either the user not being an authenticated user or the non-secure display server not being authorized, provide the second graphics data in the non-secure buffer to the requesting non-secure application window running in the non-secure environment.

14. The computing device of claim 13, wherein to receive the request comprises the processing device to:
receive a copy command to copy the first graphics data from the secure buffer and a paste command to paste the first graphics data to the non-secure application window.

15. The computing device of claim 13, wherein to receive the request comprises the processing device to:
receive a drag-and-drop command to drag an object representing the first graphics data from the secure buffer to the non-secure application window.

16. The computing device of claim 13, further comprising:
a second secure display server that provides a second secure environment to clients of the second secure display server, wherein at least one of the secure display server or the non-secure display server is a client of the second secure display server.

17. The computing device of claim 13, wherein the processing device is further to:
output at least one of the combined contents or the second graphics data to a display.

* * * * *